ial activity in the biofloc- 45
United States Patent Office 3,398,089
Patented Aug. 20, 1968

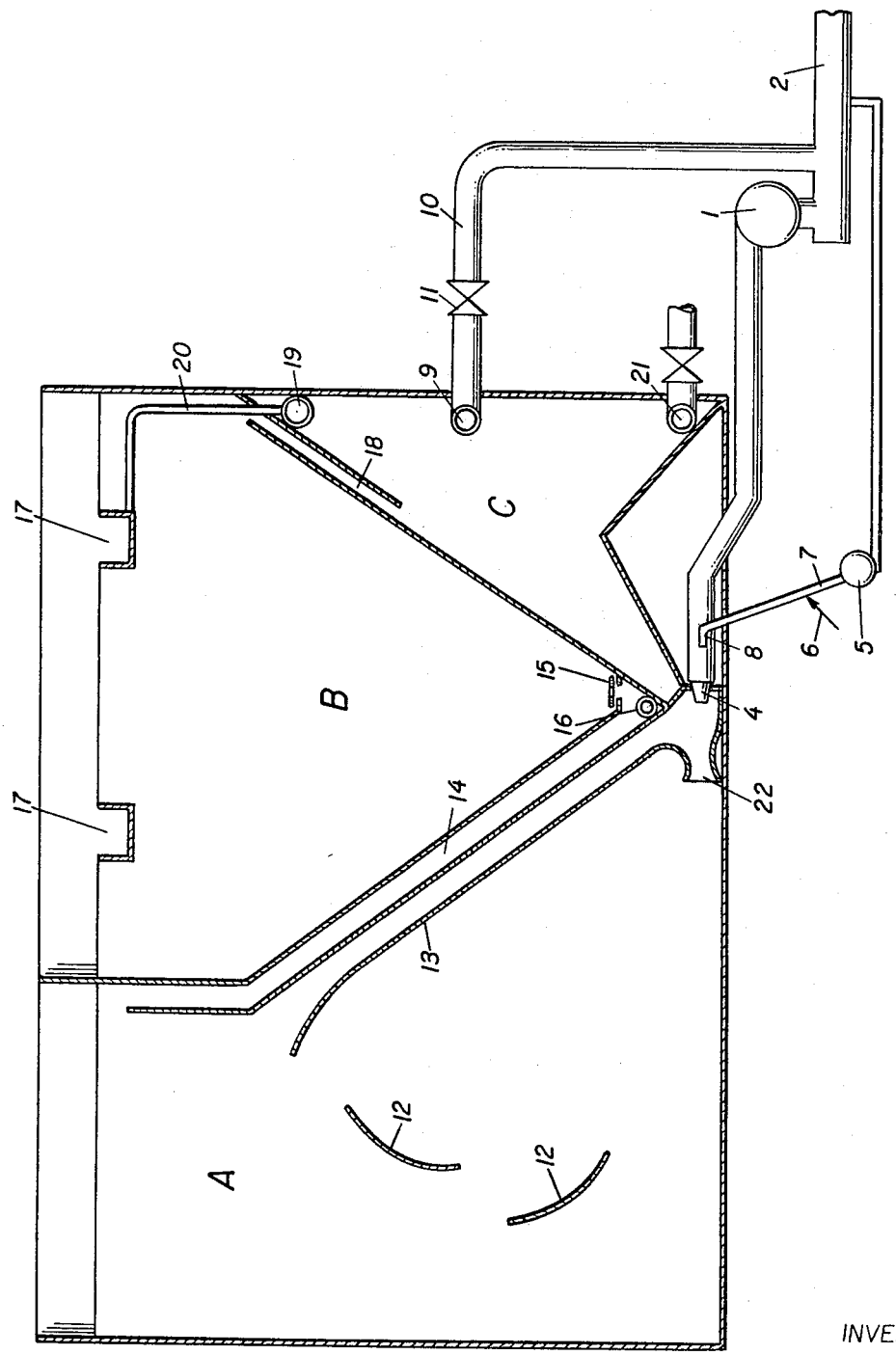

3,398,089
METHOD AND APPARATUS FOR THE BIOLOGICAL PROCESSING OF LIQUIDS
Svatopluk Mackrle, Brno, Vladimir Mackrle, Prague, and Oldrich Dracka, Ferdinand Halamek, Lubomir Paseka, and Pavel Polasek, Brno, Czechoslovakia, assignors to Ceskoslovenska akademie ved, Prague, Czechoslovakia, a corporation of Czechoslovakia
Filed Apr. 15, 1965, Ser. No. 448,422
Claims priority, application Czechoslovakia, Apr. 25, 1964, 2,424/64; Aug. 3, 1964, 4,426/64
5 Claims. (Cl. 210—7)

ABSTRACT OF THE DISCLOSURE

The invention relates to a method and apparatus for the biological processing of a liquid polluted with organic matter in a unitary structure having a bioflocculation zone, a flocculent suspension concentration zone and a filtration zone disposed intermediate said bioflocculation and concentration zones. The liquid polluted with organic matter is processed by passage thereof through a bioflocculation zone having an overflow connected at the top by a channel leading to the bottom section of the filtration zone, a flocculent suspension concentration zone and a filtration zone having an overflow connected at the top to a channel leading to the concentration zone.

---

This invention relates to a method and an apparatus for the biological processing of liquids. More particularly, it relates to an improved method and apparatus for biologically processing polluted liquids.

Biological processing of polluted liquid is most generally employed in the treatment of sewage and organically polluted waste waters and consists of two stages, viz, bioflocculation to form a flocculent suspension and separation of the flocculent suspension from the liquid.

By bioflocculation, there is meant the decomposition and degradation of organic matter and pollutants in polluted liquids by the vital process of microorganisms under aerobic conditions and the production of a readily separable flocculent suspension of the products resulting from the activity of the microorganisms. Proper aerobic conditions necessary for the microbiological activity in the bioflocculation process are suitably provided by the dispersing of gaseous oxidation medium such as air, oxygen, etc. in the liquid to be processed.

After the flocculent suspension is formed as a result of the bioflocculation process, suitable means and methods have to be used to separate it from the liquid. A portion of the separated flocculent suspension is recirculated back into the bioflocculation process step area to inoculate fresh unprocessed polluted liquid with the microorganisms and the remainder and bulk of the flocculent suspension is concentrated and then drawn off for final disposal.

Heretofore, most sewage and industrial wastes treatment plants have comprised separate units for the bioflocculation and flocculent suspension separation stages of the process, such units respectively suitably comprising bioflocculation tanks for bioflocculation and final settling tanks for the separation of the flocculent suspension.

There also exist sewage and industrial wastes treatment plants in which the separate units for the stages of the process are combined into a single device. Of such single devices, the one that has been shown to be the most efficient has been one in which an incompletely fluidized sludge blanket is employed for the separation of the flocculent suspension. In a flocculent suspension separation step using a fluidized sludge blanket, the excess of the suspension is removed from the sludge blanket by sedimention in the sludge blanket zone and such excess of flocculent suspension is concentrated at the bottom of the sludge blanket zone. One portion of the suspension is recirculated therefrom into the bioflocculation zone of the treatment device for inoculation thereof and the remainder of the flocculent suspension is concentrated and, thereafter, drawn off for its final disposal.

The use of an imperfectly fluidized sludge blanket presents a disadvantage in that the sedimentation in the sludge blanket zone results in a limited up-flow velocity which limits the output of the single unit processing device. A further disadvantage ensuing from the sedimentation of the flocculent suspension in the sludge blanket zone is the requirement of very great height for the single unit processing device because of the necessary vertical arrangement of the sludge blanket and the sludge concentrating zones. Such vertical arrangement is disadvantageous from the point of space required by the device, from the point of providing of proper aerobic conditions in the system, and from the point of regulation of recirculated flocculent suspension.

It is to be noted that to produce effective bioflocculation, a homogeneous mixture of liquid to be processed, gaseous oxidation medium and recirculated flocculent suspension is required in the bioflocculation zone. Heretofore, such homogeneity of mixture has been achieved in known apparatus for biologically processing polluted liquids by mechanical or pneumatic aeration systems. Pneumatic aeration systems, which employ compressed air diffusers, provide oxygen for the bioflocculation process and support flow circulation of the mixture in the bioflocculation zone. However, the use of pneumatic aeration systems is disadvantageous in that the bulk of diffused air is utilized to support the flow circulation in the bioflocculation zone and there is, consequently, a relatively low air utilization for the biological and biochemical processes in the bioflocculation step. Furthermore, pneumatic aeration systems require large amounts of air entailing the need for large blowers or ventilators, the operation, maintenance and costs of the latter being quite high. As for mechanical aeration systems, the disadvantage presented in their use is a low aeration efficiency.

Accordingly, it is an important object of this invention to provide an improved method of bioflocculation which is stable, effective and economical.

It is another object to provide improved bioflocculation apparatus wherein the bioflocculation zone and the separation section are combined in a unitary structure.

It is a further object to provide a bioflocculation apparatus in accordance with the preceding object which lends itself to being manufactured as a relatively small, compact, portable apparatus.

The inventive method described herein is a method for biologically processing a liquid polluted with organic matter in which a mixture comprising the liquid and a recirculated flocculent suspension produced by bioflocculation is caused to flow by natural gravity forces from a bioflocculation zone through a connecting channel and distributing apertures into a filtration zone. In the filtration zone, the flocculent suspension is separated by filtration in a fully fluidized sludge blanket. The excess of separated flocculent suspension is caused to flow from the aforesaid fully fluidized sludge blanket into a recirculation and concentration zone through a draw-off channel, such flowing being effected by the action of a continuous recirculation of a portion of the flocculent suspension back into the bioflocculation zone and the drawing off of the remainder of the aforesaid flocculent suspension to concentrate it whereby supernatant water may be removed from the recirculation and concentration zone to effluent collecting troughs. The concentrated flocculent suspension may be periodically blown off from the recirculation and concentration zone for final disposal thereof.

A homogeneous mixture of liquid to be processed, recirculated flocculent suspension and gaseous oxidation medium is achieved in the bioflocculation zone by emulsification of the gaseous oxidation medium by a flow emulsifier to form an emulsion thereof and by mixing the thus formed emulsion with the liquid and recirculated flocculent suspension in an inlet jet of the bioflocculation zone. The energy of such mixture entering into the bioflocculation zone simultaneously provides a uniform circulating flow of the total volume of the material contained in the bioflocculation zone. The emulsification of the gaseous oxidation medium together with the utilizing of the energy of the entering mixture for circulating flow in the bioflocculation zone enables the providing of the oxidation medium in an amount necessary for efficient action of microbiological life processes.

The inventive apparatus described herein is an apparatus for biologically processing liquids polluted with organic matter which comprises a bioflocculation zone and a separation section, the separation section comprising a filtration zone, and a recirculation and concentration zone. The bioflocculation zone and the two zones in the separation section are interconnected and are combined in a single functional unit. The bioflocculation and filtration zones are interconnected by a connecting channel and flow distribution apertures. The filtration zone and the recirculation and concentration zone are interconnected by draw-off channels. The final effluent is collected in the upper portion of the filtration zone by final effluent collecting troughs. The recirculation concentration zone comprises a system for recirculation of flocculent suspension back into the bioflocculation zone and pipes for desludging and drawing off settled supernatant water.

For recirculating flocculent suspension, for mixing the recirculated flocculent suspension with liquid to be processed and the emulsion of the gaseous oxidation medium, and for providing the energy to effect circulation of the resulting mixture in the bioflocculation zone, two pumps are provided. One of the pumps is used to deliver the bulk of liquid to be processed into the bioflocculation zone. This pump is connected to the bioflocculation zone by a delivery pipe provided with a jet at its end. The flow energy imparted by the action of the jet effects the mixing of the components and vigorous flow circulation in the bioflocculation zone.

To support the flow circulation in the bioflocculation zone, it is provided with suitable baffles, and for effective utilization of the gaseous oxidation medium, a high degree of emulsion thereof is provided. The other of the two pumps provides the necessary pressure for producing emulsification of the gaseous medium in a flow emulsifier. The outlet from the flow emulsifier is connected to the hereinabove mentioned delivery pipe proximal to the jet on the end thereof, the mixing of the gaseous oxidation medium emulsion with liquid and recirculated flocculent suspension occurring in the jet.

Generally speaking and in accordance with the invention, there is provided a method for biologically processing a liquid polluted with organic matter comprising introducing a mixture of the liquid, recirculated flocculent suspension produced by bioflocculation of the liquid and an emulsified gaseous oxidation medium into a bioflocculation zone at a relatively high flow energy to bioflocculate the liquid to form a flocculent suspension, filtering the resulting mixture of bioflocculent suspension and processed liquid in a filtration zone in a fully fluidized sludge blanket to separate the bulk of the suspension, recirculating a portion of the separated suspension back into the bioflocculation zone, removing the remainder of the suspension to concentrate it and to produce a supernatant relatively clean liquid thereon, and collecting the last named liquid.

Also, and in accordance with the invention, there is provided an apparatus for the biological processing of a liquid polluted with organic matter comprising a unitary structure comprising a bioflocculation zone, a flocculent suspension concentration zone and a filtration zone disposed intermediate the bioflocculation and conentration zones. Means are provided for introducing a mixture of flocculent suspension, the polluted liquid and gaseous oxidation medium into the bioflocculation zone with a relatively high flow energy to form flocculent suspension therein, a channel being provided to connect the bioflocculation zone to the lower portion of the filtration zone for transferring the mixture of processed liquid and bioflocculated suspension from the flocculation zone to the filtration zone to separate the suspension from the liquid in the filtration zone in a fully fluidized sludge blanket. Drawoff channels are included interconnecting the filtration and concentration zones and processed liquid collecting troughs are disposed in the filtration zone. There are further provided a processed liquid draw-off pipe and conduit means associated with the draw-off pipe located in the concentration zone and leading into the collecting troughs, a conduit being included connected between the concentration zone and the mixture introducing means for recirculating a portion of flocculent suspension from the concentration zone into the bioflocculation zone.

For a better understanding of the invention, together with other and further objects thereof, reference is had to the following description taken in connection with the accompanying drawing and its scope is pointed out in the appended claims.

The drawing is a schematic depiction of an embodiment of apparatus constructed according to the invention, for biologically processing a liquid polluted with organic matter and waste.

Referring now to the drawing, the apparatus shown therein comprises a bioflocculation zone A, a filtration zone B and a recirculation and concentration zone C, the three zones being contained in a single functional unit. A channel 14 interconnects bioflocculation zone A and the lower end of zone B. The inlet to zone B comprises distributing apertures 15, a draining and rinsing pipe 16 being located under apertures 15. Final effluent collecting troughs 17 are provided in the upper portion of filtration zone B.

Filtration zone B, and recirculation and concentration zone C are interconnected by draw-off channels 18, a settled water draw-off pipe 19 being provided behind channels 18 at the upper portion of zone C as shown. A pipe 20 interconnects channels 18 and troughs 17. Included in zone C is a recirculation pipe 9 and a desludging pipe 21.

For recirculating flocculent suspension from zone C to zone A, for dispersing gaeous oxidation medium and for mixing liquid with the recirculated flocculent suspension and the oxidation medium, pumps 1 and 5, a flow emulsifier 8, a jet 4 and baffles 12 and 13 are provided. Pump 1 is connected through a liquid inlet 2 and through a pipe 10 to recirculation pipe 9, pipe 9 suitably being provided with a measurement and regulating device 11. Pump 1 is connected to bioflocculation zone A through a delivery pipe 3, pipe 3 terminating in jet 4. Pump 5 is connected to inlet 2 and is the pump which provides the necessary pressure for emulsifying the gaseous oxidation medium in flow emulsifier 8, pump 5 being connected to emulsifier 8 through pipe 7, pipe 7 being provided with equipment depicted by an arrow and designated with the numeral 6 for introducing and adding gaseous oxidation medium to the system. It is seen in the figure that the outlet of flow emulsifier 8 enters into pipe 3 proximal to the location of jet 4. Baffles 12 and 13 in zone A together form an ejector into which jet 4 extends.

In considering the operation of the apparatus depicted in the figure, the bulk of liquid to be processed is pumped by pump 1 from inlet 2 into bioflocculation zone A. Pump 1 at the same time recirculates the flocculent suspension from zone C through pipes 9 and 10. The gaseous oxidation medium added to the liquid by equipment 6 and emulsified by emulsifier 8 is mixed with liquid and recirculated suspension in jet 4 and propelled into zone A to effect flow circulation therein, such circulation being supported by the ejector comprising baffles 12 and 13.

In zone A in which bioflocculation takes place, the liquid and suspension gravity flow through channel 14 and apertures 15 into filtration zone B wherein the separation of the flocculent suspension from the processed liquid occurs by filtration in a fully fluidized sludge blanket, the final effluent being collected in troughs 17.

The excess of flocculent suspension is drawn off through channels 18 into zone C through the action of the continuous recirculation of a portion of the flocculent suspension in zone A and by the drawing off of the remainder of the flocculent suspension to concentrate it. The recirculation of flocculent suspension is effected by pump 1, connected to pipe 9 through pipe 10, pipe 9 serving to collect recirculated flocculent suspension, the degree of recirculation being measured and controlled by device 11. The portion of the flocculent suspension which is concentrated is periodically blown off by desludging pipe 21 for its final disposal and the supernatant liquid is removed from zone C to troughs 17 by pipes 19 and 20.

The invention described herein presents many advantages. Thus, the filtration in a fully fluidized sludge blanket to separate the recirculated flocculent suspension produced by bioflocculation greatly enhances the biological processing of polluted liquids. The drawing off of the excess of flocculent suspension from the upper portion of the fully fluidized sludge blanket enables direct and immediate recirculation of the separated flocculent suspension back into the flocculation zone in a substantially fresh state. The amount of recirculated flocculent suspension can be regulated in a range of 0 to 100 percent without affecting the efficiency of the separation process in the fully fluidized sludge blanket. The employment of a highly emulsified gaseous oxidation medium produced by flow emulgation results in favorable and effective aerobic conditions in the bioflocculation zone. The high efficiency of utilization of emulsified gaseous oxidation medium together with the flow circulation of the mixture in the bioflocculation zone enabled by the energy of the liquid entering thereinto results in the adjustment of the gaseous oxidation medium to an amount which is necessary and favorable for biological processes. Indeed, a high-rate biological process is made possible by the recirculation of a relatively large proportion of fresh flocculent suspension, and good aerobic conditions as well as proper mixing of incoming liquid, recirculated flocculent suspension, and gaseous oxidation medium, and the vigorous flow circulation of the mixture in the bioflocculation zone. The facile regulation of aerobic conditions and the amount of flocculent suspension which is recirculated renders the process stable and economical. The combination of all of the functional zones in a single unit makes possible the construction of small compact devices for the biological processing of liquids, such devices lending themselves to being manufactured as a complete and portable apparatus.

The method and apparatus of the invention in addition to being advantageously utilized in sewage and waste treatment may also be employed in any continuous industrial microbiological process wherein there is utilized bioflocculation for the conversion of organic matter into a flocculent suspension which is readily separable from a processed liquid by filtration in a sludge blanket.

While there has been described what is at present considered to be a preferred embodiment of this invention, it will be obvious to those skilled in the art that various changes and modifications may be made therein without departing from the invention and it is, therefore, aimed to cover all such modifications as fall within the true spirit and scope of the invention.

What is claimed is:

1. A method for biologically processing a liquid polluted with organic matter by passage of the liquid through a bioflocculation zone having an overflow connected at the top by a channel leading to the bottom section of a filtration zone, a flocculent suspension concentration zone, the filtration zone having an overflow connected at the top to a channel leading to the concentration zone, the steps comprising:

(a) introducing an hydraulically emulsified oxidation medium into a mixture of polluted liquid and a recirculated flocculent suspension to produce by bioflocculation a flocculent suspension in the bioflocculation zone;

(b) circulating the contents of said bioflocculation zone by means of a relatively vigorous incoming energy of flow of said mixture into said bioflocculation zone;

(c) transferring the biologically processed liquid and resultant flocculent suspension depleted of emulsified gaseous oxidation medium by means of a descending flow of said biologically processed liquid through the first-recited channel thereby removing asid processed liquid from the upper part of said bioflocculation zone and leading it into the bottom section of the filtration zone;

(d) separating the said flocculent suspension from the biologically processed liquid in the filtration zone by filtering of said flocculent suspension in a fluidized sludge blanket, removing flocculent suspension through the overflow and passing it into the channel leading to the concentration zone;

(e) concentrating said flocculent suspension in the concentration zone; and (f) recirculating a portion of said concentrated sludge from said concentration zone back into the bioflocculation zone.

2. Method as defined in claim 1, further including the step of imparting high flow energy to a portion of said polluted liquid which has been fed with an oxidation medium.

3. An apparatus for the biological processing of a liquid polluted with organic matter comprising a unitary structure including a bioflocculation zone, a flocculent suspension concentration zone and a filtration zone disposed intermediate said bioflocculation and concentration zones, a jet means for introducing a mixture of flocculent suspension, said liquid, and gaseous oxidation medium into said bioflocculation zone with a relatively high flow energy to form flocculent suspension therein, a channel connecting said bioflocculation zone to said filtration zone for transferring the mixture of processed liquid and bioflocculent suspension from said bioflocculation zone to said filtration zone to separate said suspension from said liquid in said filtration zone in a fully fluidized sludge blanket, draw-off channels interconnecting said filtration and concentration zones, processed liquid collecting troughs disposed in said filtration zone, a processed liquid draw-off pipe and conduit means located in said concentration zone and connecting to said collecting troughs, a conduit for recirculating a portion of flocculent suspension from the concentration zone into the mixture introducing means connected between said concentration zone and said mixture introducing means, and further including means adapted to have a gaseous oxidation medium introduced thereinto and terminating at a point in said last-named conduit proximal to said jet, and a pump associated with said last-named means to emulsify said gaseous oxidation medium prior to its mixing with polluted liquid and recirculated flocculent suspension.

4. An apparatus as defined in claim 3 and further including a pump associated with said conduit, and said means for introducing said mixture.

5. An apparatus as defined in claim 3 and further including baffles located in said bioflocculation zone for forming an ejector into which said jet extends.

References Cited

UNITED STATES PATENTS

| 3,246,762 | 4/1966 | Sontheimer et al. | 210—197 X |
| 3,306,449 | 2/1967 | Minegishi | 210—221 X |
| 3,313,725 | 4/1967 | Tsuda et al. | 210—20 |

MICHAEL E. ROGERS, *Primary Examiner.*